United States Patent
Bianchi et al.

(10) Patent No.: US 6,538,552 B2
(45) Date of Patent: Mar. 25, 2003

(54) THERMOSTAT, IN PARTICULAR FOR ELECTRIC HOUSEHOLD APPLIANCES

(75) Inventors: Raoul Bianchi, Villa Guardia (IT); Roberto Malpetti, Lozza (IT); Alfredo De Pasca, Varese (IT); Marco Sclip, Brunello (IT)

(73) Assignee: ITW Industrial Components S.r.l., Milan (IT)

( * ) Notice: Subject to any disclaimer, the term of this patent is extended or adjusted under 35 U.S.C. 154(b) by 112 days.

(21) Appl. No.: 09/748,108

(22) Filed: Dec. 27, 2000

(65) Prior Publication Data

US 2002/0014946 A1 Feb. 7, 2002

(30) Foreign Application Priority Data

Dec. 28, 1999 (IT) .......................... TO99A1164

(51) Int. Cl.[7] .............................................. H01H 37/02
(52) U.S. Cl. ..................... 337/304; 337/1; 337/298; 361/103; 62/132
(58) Field of Search ................. 337/1, 2, 298, 337/304; 361/103; 62/132; 338/215

(56) References Cited

U.S. PATENT DOCUMENTS

| | | | |
|---|---|---|---|
| 3,543,840 A | | 12/1970 | Chambers |
| 3,768,545 A | * | 10/1973 | Wills .......................... 165/256 |
| 4,585,926 A | | 4/1986 | Easthill |
| 4,706,467 A | | 11/1987 | Thorsen et al. |
| 5,161,606 A | * | 11/1992 | Berkeley et al. ........... 165/11.1 |

FOREIGN PATENT DOCUMENTS

| | | |
|---|---|---|
| EP | 0570870 | 11/1993 |
| GB | 1259143 | 1/1972 |

* cited by examiner

Primary Examiner—Jayprakash N. Gandhi
(74) Attorney, Agent, or Firm—Lowe Hauptman Gilman & Berner, LLP

(57) ABSTRACT

A thermostat, in particular for electric household appliances, including a mechanical switch and an analog regulating circuit having a variable-ratio reference divider. The reference divider includes a reference resistor and a variable-resistance resistive element; and the mechanical switch connects the variable-resistance resistive element to the reference resistor.

19 Claims, 2 Drawing Sheets

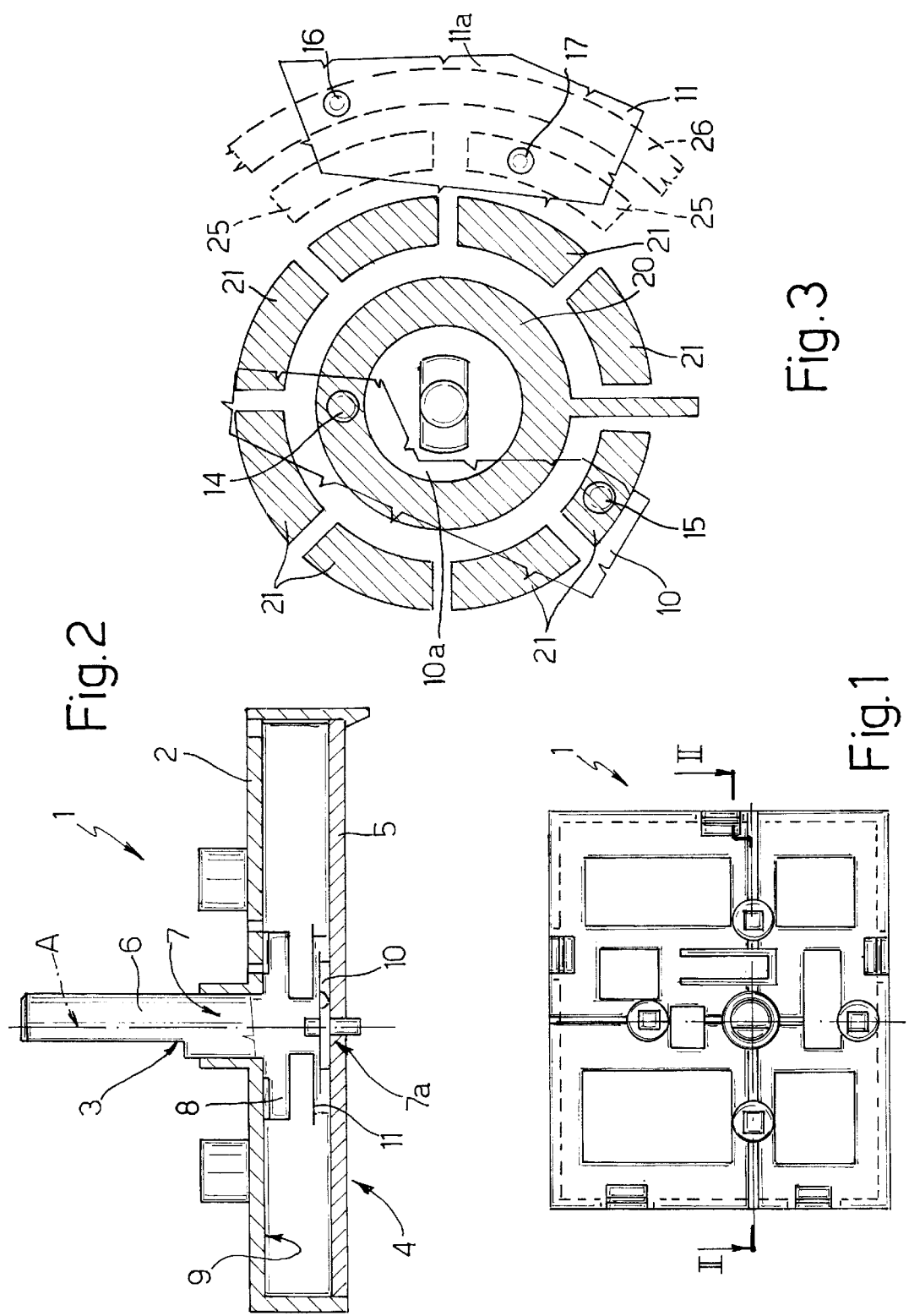

THERMOSTAT, IN PARTICULAR FOR ELECTRIC HOUSEHOLD APPLIANCES

The present invention relates to a thermostat, in particular for electric household appliances, and which is especially suitable for refrigerators and freezers.

BACKGROUND OF THE INVENTION

As is known, various types of thermostats for electric household appliances are currently available.

Mechanical thermostats are one type, which employ an expanding, temperature-sensitive mechanical member connected to a switch to turn an actuating device on or off. In refrigerators and freezers, for example, to which the following description refers purely by way of example, the actuating device is defined by a compressor connected to the cooling circuit; the expanding mechanical member, e.g. an expansion box, is connected to a mechanical device for setting the thermostat to a predetermined temperature; and, when the detected temperature differs from the predetermined temperature, the thermostat activates the switch to turn the compressor on or off.

Being easily damaged, mechanical thermostats have the drawback of being unreliable, besides being inaccurate, which is why they have now been replaced with digital and analog electronic or electromechanical types.

Analog thermostats comprise a regulating circuit and employ a sensor (e.g. a thermocouple) for supplying a signal, e.g. a voltage, indicating the value of the temperature to be regulated. Known analog thermostats, however, are also inaccurate as regards the user interface, and call for relatively complex signal processing circuits.

For this reason, users in particular prefer digital thermostats, which sample and compare the sensor signal with a reference value by means of a microprocessor. A nonvolatile (e.g. EEPROM) memory may store the reference values corresponding to each selectable target temperature value.

As compared with analog thermostats, digital types therefore have the advantage of selecting extremely precise reference values for the desired target temperature and so enabling better adjustment. And user information may be provided concerning the currently set target temperature, e.g. by indicating the temperature value on a display.

On the other hand, digital thermostats have the drawback of being extremely expensive, by comprising complex components such as a microprocessor and nonvolatile memory.

SUMMARY OF THE INVENTION

It is an object of the present invention to provide a thermostat designed to eliminate the aforementioned drawbacks, and which, in particular, is cheap and easy to produce, while at the same time providing for fairly accurate, reliable temperature adjustment.

It is a further object of the invention to provide a thermostat of the above type, which, in a preferred embodiment, provides a user display of, or at least an ideogram proportional to, the set target temperature, so that, as far as the end user is concerned, the thermostat is "equivalent" in performance to a digital type.

According to the present invention, there is provided a thermostat, in particular for electric household appliances, for activating an actuating device, in particular a refrigerator or freezer cooling circuit compressor, and characterized by comprising, in combination: a mechanical switch that selectively assumes a number of different configurations; and an alalog regulating circuit including an input contact receiving an input voltage from a temperature sensor, and a variable-ratio reference divider; said reference divider comprising a reference resistor, and resistive means for selectively assuming a number of different predetermined electric resistance values; said mechanical switch connecting said resistive means to said reference resistor so that, for each configuration in said number of different configurations of said switch, said resistive means selectively assume a predetermined electric resistance value in said reference divider.

In a preferred embodiment, the analog regulating circuit comprises an operational amplifier and a selector. The operational amplifier has a noninverting terminal connected to a reference node of the reference divider, and an inverting terminal connected to said input contact; and the selector has an input terminal connected to a mains supply line, a first output terminal connected to a floating terminal, and a second output terminal connected to an actuating device.

The thermostat is therefore extremely cheap and easy to produce, while at the same time permitting accurate selection of the desired target temperature value and accurate temperature adjustment.

In a preferred variation, the thermostat also comprises a device for displaying the set temperature, and comprising, for example, a battery of LED's.

This therefore affords the further advantage of a user display indicating the currently set temperature, as on more expensive digital thermostats.

BRIEF DESCRIPTION OF THE DRAWINGS

A preferred, non-limiting embodiment of the present invention will be described by way of example with reference to the accompanying drawings, in which:

FIG. 1 shows a top plan view of a thermostat in accordance with the present invention;

FIG. 2 shows a cross section along line II—II of the FIG. 1 thermostat;

FIG. 3 shows a larger-scale detail of the FIG. 1 thermostat;

DETAILED DESCRIPTION OF THE INVENTION

Figure 4:
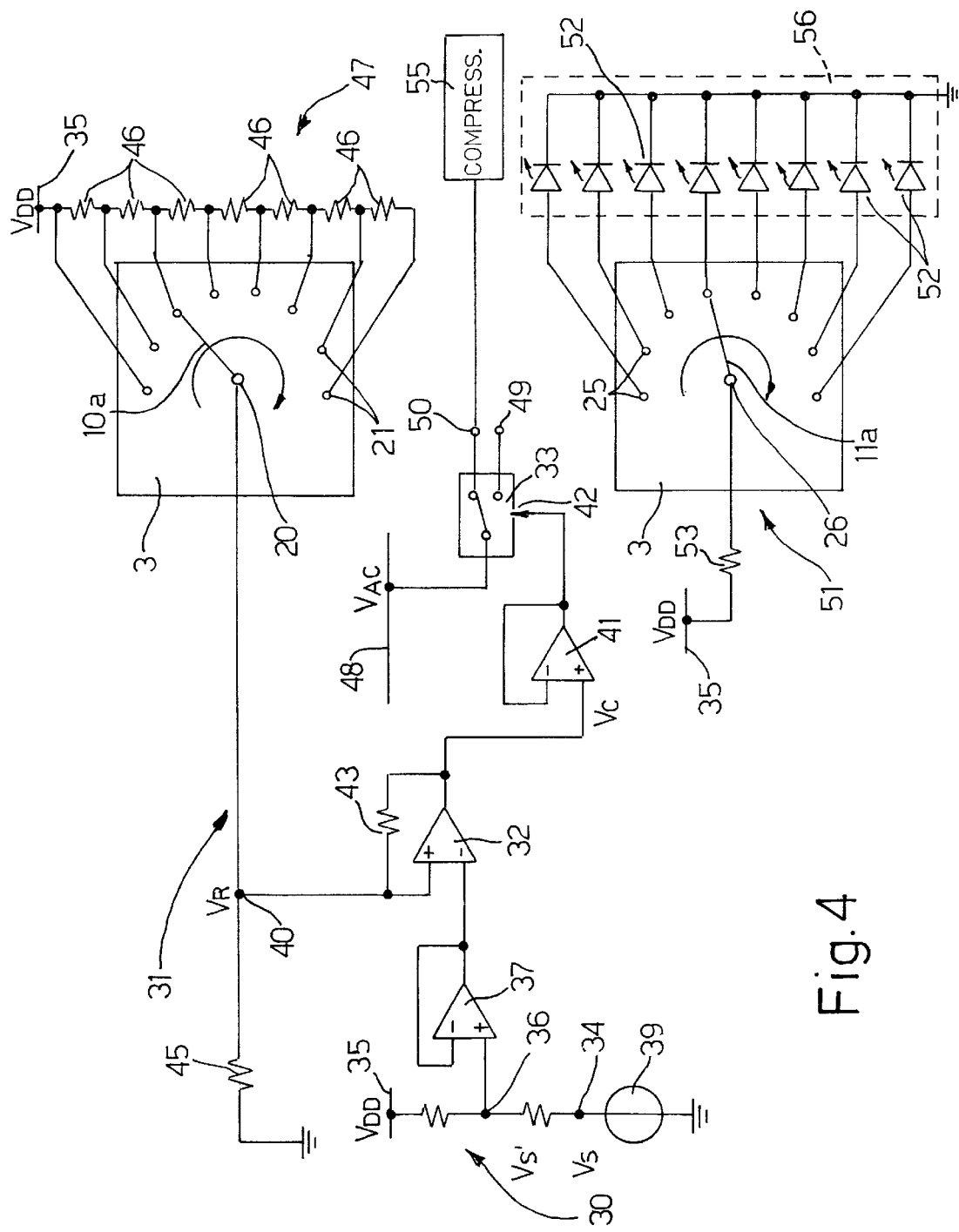
FIG. 4 shows a simplified electric diagram of the FIG. 1 thermostat.

Number 1 in FIGS. 1 and 2 indicates an analog thermostat, e.g. for regulating the operating temperature of a refrigerator or freezer, to which application reference is made in the following description purely by way of example.

Thermostat 1 comprises a cup-shaped casing or support 2 made of electrically insulating, e.g. synthetic plastic, material; a rotary mechanical switch 3; and a regulating circuit 4 formed on a base 5 defined by a printed circuit which clicks onto support 2.

Switch 3 comprises a shaft 6 connected to an adjusting knob (not shown for the sake of simplicity) and housed inside a seat 7 in support 2 and a corresponding seat 7a in base 5. Shaft 6 comprises a flange 8 for retaining it gripped between base 5 and support 2.

Flange 8 is connected in known manner to an inner surface 9 of support 2 to keep shaft 6 positioned precisely with respect to base 5, and has a known device for selectively and releasably arresting shaft 6 in a number of predetermined angular positions corresponding to respective different operating configurations (positions) of switch 3. For example, flange 8 may comprise a radial projection (not shown) cooperating selectively with one of a number of grooves (not shown) formed in inner surface 9 and each corresponding to a respective operating configuration (position) of switch 3.

Switch 3 also comprises a first and a second metal plate 10, 11 electrically insulated from each other, fitted angularly integral with shaft 6, and located close to base 5. First metal plate 10 comprises a first and a second boss 14, 15 located different distances from the axis of rotation A of shaft 6; and second plate 11 has a third and fourth boss 16, 17 located further away from axis of rotation A than first and second boss 14, 15.

As shown in FIG. 3, switch 3 also comprises an inner annular contact 20 and a number of selectable regulating contacts 21, all formed on base 5 and connected, as will be seen, to and for controlling operation of regulating circuit 4.

Selectable regulating contacts 21 are equal in number to the predetermined number of operating positions of switch 3 (e.g. eight), and are in the form of annular sectors arranged outwards of and concentrically with respect to inner annular contact 20. Both inner annular contact 20 and selectable regulating contacts 21 are coaxial with the axis of rotation A of shaft 6.

First boss 14 cooperates electrically in sliding contact with inner annular contact 20, while second boss 15 is selectively positionable, by rotating shaft 6, in sliding contact with one of selectable regulating contacts 21, so that metal plate 10 forms a first bridge 10a of switch 3 and, depending on the operating position set by the user, selectively connects one of selectable regulating contacts 21 to inner annular contact 20.

The dash lines in FIG. 3 show further selectable display contacts 25 and an outer annular contact 26, which are optional and form part of a preferred embodiment of the invention, and which, like inner annular contact 20 and selectable regulating contacts 21, are connected by the third and fourth boss 16, 17 of second metal plate 11 forming a second bridge 11a of switch 3.

FIG. 4 shows an electric diagram of regulating circuit 4, which comprises an input divider 30; a variable-ratio reference divider 31; a first operational amplifier 32; and a selector 33.

Input divider 30 is located between an input contact 34 of regulating circuit 4 and a constant-supply line 35 supplying a supply voltage $V_{DD}$, e.g. of 24 V. Input contact 34 is connected to a temperature sensor 39, here represented by a voltage source, which supplies an input voltage $V_s$ representing a current value of the temperature to be regulated.

An intermediate node 36 of the input divider is connected to a noninverting terminal of a second voltage-follower operational amplifier 37 having the inverting terminal and the output terminal connected directly to each other. The output terminal of second operational amplifier 37 is also connected to an inverting terminal of first operational amplifier 32.

First operational amplifier 32 has the noninverting terminal connected to a reference node 40 of reference divider 31, and the output terminal connected to a control terminal 42 of selector 33 via a third voltage-follower operational amplifier 41. A feedback resistor 43 is located between reference node 40 and the output terminal of first operational amplifier 32.

Reference divider 31 comprises a reference resistor 45 connected between reference node 40 and ground; and a variable-resistance resistive element 47 defined by a battery of selectable resistors 46, each located between two adjacent selectable regulating contacts 21. One of selectable resistors 46 has a terminal connected to constant-supply line 35; and inner annular contact 20, selectively connected to one of selectable regulating contacts 21 by first bridge 10a of switch 3, is connected to reference node 40.

Selector 33, preferably a two-position hysteresis relay, is controlled by a control voltage $V_c$ and has an input terminal connected to a mains supply line 48 supplying a mains voltage $V_{AC}$. Selector 33 also has two output terminals connected respectively to a floating contact 49 and to a control contact 50 in turn connected to an actuating device, e.g. a compressor 55 (known and not shown in details) of a cooling circuit of the electric household appliance. Selector 33 connects mains supply line 48 to floating terminal 49, when energized, and to control contact 50 when not energized.

In the preferred embodiment shown, regulating circuit 4 also comprises a display device 51 comprising a battery of LED's 52, each connected between a respective selectable display contact 25 and ground. Contacts 25 are connected to outer annular contact 26 by the second bridge of switch 3, which is activated integrally with the first bridge. LED's 52, each of which corresponds to a selectable target temperature value, are visible from outside through a mask 56 (shown by the dash line in FIG. 4) preferably imprinted with the target temperature values.

A display resistor 53 is connected between outer annular contact 26 and constant-supply line 35.

Thermostat 1 operates as follows. When switch 3 is turned, inner annular contact 20 is connected to one of selectable regulating contacts 21 by first bridge 10a, so that all the selectable resistors 46 between the selectable contact and constant-supply line 35 are connected to reference node 40.

This therefore sets a division ratio value of reference divider 31 and, consequently, also a value of a reference voltage $V_R$ present at reference node 40 and indicating a desired target temperature value. A corresponding LED 52 is powered to show the user the set target temperature value.

First operational amplifier 32 supplies a control voltage $V_c$ as a function of the difference between reference voltage $V_R$ and an intermediate voltage $V_s'$ present at intermediate node 37, proportional to input voltage $V_s$, and supplied to the inverting terminal of first operational amplifier 32.

Via third operational amplifier 41, control voltage $V_c$ is supplied to control terminal 42 of selector 33 to energize or deenergize the selector.

More specifically, when the temperature being regulated is above the set target temperature, intermediate voltage $V_s'$ is lower than reference voltage $V_R$, and control voltage $V_c$ generated by first operational amplifier 32 is such as to deenergize selector 33, which therefore connects the mains supply line to control contact 50 to activate the cooling circuit compressor 55 and lower the temperature being regulated. As a result, input voltage $V_s$, intermediate voltage $V_s'$ and control voltage $V_c$ also fall until control voltage $V_c$ falls below a first predetermined threshold (corresponding to a temperature value slightly below the set target temperature value) and selector 33 is energized.

Mains supply line 48 is then connected to floating contact 49 and compressor 55 is deactivated, so that the temperature being regulated begins to rise, thus increasing input voltage $V_s$, intermediate voltage $V_s'$ and control voltage $V_c$.

When control voltage $V_c$ exceeds a second predetermined threshold (corresponding to a temperature value slightly higher than the set target temperature value), selector 33 is deenergized and compressor 55 activated once more.

The temperature is thus regulated accurately by causing it to oscillate about the set target temperature value.

Clearly, changes may be made to the thermostat as described herein without, however, departing from the scope of the present invention.

In particular, discrete-operation switch 3 may be replaced with a device for continuously varying the value of reference voltage VR and hence the set target temperature value (e.g. a potentiometer). In which case, as opposed to selectable regulating contacts 21 and the battery of selectable resistors 46, a track made of material of a given resistivity may be formed about, and connected by the first bridge to, inner annular contact 20.

The battery of led's 52 indicating the set target temperature may be replaced with a different known display device.

What is claimed is:

1. A thermostat for activating a compressor of a refrigerator, said thermostat comprising:
    a temperature sensor (39);
    a mechanical switch (3) that selectively assumes a number of different configurations; and
    an analog regulating circuit (4) including an input contact (34) receiving an input voltage (Vs) from said temperature sensor (39), and a variable-ratio reference voltage divider (31);
    said reference voltage divider comprising a reference resistor (45), and resistive means (47) selectively assuming a number of different predetermined electric resistance values;
    said mechanical switch (3) electrically connecting said resistive means (47) to said reference resistor (45) so that, for each of said configurations of said switch (3), said resistive means (47) selectively assume one of said predetermined electric resistance values in said reference voltage divider (31).

2. A thermostat as claimed in claim 1, wherein said mechanical switch (3) comprises
    a rotary shaft (6);
    an inner annular contact (20);
    a number of selectable regulating contacts (21); and
    a first metal plate (10) fitted to and angularly integral with said shaft (6) so as to slide in permanent electrical contact with said inner annular contact (20) and selectively in electrical contact with one of said selectable regulating contacts (21).

3. A thermostat as claimed in claim 2, wherein said switch (3) also comprises
    a number of selectable display contacts (25);
    an outer annular contact (26); and
    a second metal plate (11) fitted to and angularly integral with said shaft (6) and insulated electrically from said first metal plate (10) so as to slide in permanent electrical contact with said outer annular contact (26) and selectively in electrical contact with one of said selectable display contacts (25).

4. A thermostat as claimed in claim 3, further comprising a display device (51) for displaying a set target temperature.

5. A thermostat as claimed in claim 4, wherein said display device (51) comprises a battery of LEDs (52), each connected to a respective one of said selectable display contacts (25) of said mechanical switch (3).

6. A thermostat as claimed in claim 1, wherein said analog regulating circuit (4) further comprises an operational amplifier (32) and a selector (33); said operational amplifier (32) having a noninverting input terminal connected to a reference node (40) of said reference voltage divider (31), and an inverting input terminal connected to said input contact (34).

7. A thermostat as claimed in claim 6, wherein said selector (33) has an input terminal connected to a mains supply line (48), a first output terminal connected to a floating terminal (49), and a second output terminal connectable to said actuating device (55).

8. A thermostat as claimed in claim 2, wherein said analog regulating circuit (4) and said contacts (20, 21) of said mechanical switch are carried on a base (5) defined by a printed circuit board; said shaft being carried by a cup-shaped insulating support (2) packed mechanically to said base (5).

9. A thermostat as claimed in claim 6, wherein said operation amplifier is configured to function as a comparator for comparing a reference voltage (Vr) at the reference node of said reference voltage divider with said input voltage (Vs) from said temperature sensor and, based on the comparison, generating a control voltage (Vc) which drives said selector to activate or deactivate the compressor.

10. A thermostat as claimed in claim 6, wherein the reference node is located between said reference resistor and said resistive means, the reference voltage is directly fed from the reference node to the noninverting input terminal of said operational amplifier without being substantially modified.

11. A thermostat as claimed in claim 1, wherein said switch comprises:
    a first contact connected to said reference resistor;
    a plurality of second contacts connected to said resistive means, each of said second contacts corresponding to one of said configurations of said switch and, hence, one of said predetermined electric resistance values of said resistive means; and
    a movable connecting element for selectively electrically connecting said first contact with one of said second contacts so that said resistive means, said connecting element, and said reference resistor are connected in series.

12. A thermostat as claimed in claim 11, wherein said reference resistor has one terminal connected to said first contact and another terminal directly grounded, said resistive means being a string of resistors connected in series, one end of the string is connected to a voltage supply so as to form a closed circuit including the voltage supply, the resistive means, the connecting element, the reference resistor and ground.

13. A control circuit for an electric household appliance, comprising:
    a sensor for generating an input voltage (Vs);
    an actuator adapted to be coupled to the electric household appliance; and
    an regulating circuit for receiving the input voltage from said sensor and coupled to said actuator for supplying said actuator with a control voltage in accordance with the input voltage and an internal setting of said regulating circuit, said actuator adapted to activate or deactivate the electric household appliance in accordance with the control voltage;
    wherein said regulating circuit further comprises
        a reference voltage divider having a reference resistor connected in series with a variable resistor having numerous selectable electric resistance values; and a comparator having a first input terminal coupled to said sensor for receiving the input voltage and a second input terminal coupled to a reference node between said reference resistor and said variable resistor for receiving a reference voltage at said reference node, said comparator comparing the input voltage with the reference voltage and, based on the comparison, generating the control voltage;

wherein a resistance value of said reference resistor is independent of the selectable electric resistance values of said variable resistor.

14. A control circuit of claim 13, wherein said reference resistor and said variable resistor are connected in series between a power supply and ground.

15. A control circuit of claim 13, wherein said regulating circuit further comprises a rotary switch coupled to said variable resistor to enable selection of one among the selectable electric resistance values of said variable resistor, the selected resistance value of said variable resistor defining said internal setting of said regulating circuit.

16. A control circuit for an electric household appliance, comprising:

a sensor for generating an input voltage (Vs);

an actuator adapted to be coupled to the electric household appliance; and an regulating circuit for receiving the input voltage from said sensor and coupled to said actuator for supplying said actuator with a control voltage in accordance with the input voltage and an internal setting of said regulating circuit, said actuator adapted to activate or deactivate the electric household appliance in accordance with the control voltage;

wherein said regulating circuit further comprises
a reference voltage divider including a reference resistor and a variable resistor connected in series between a power supply and ground, said variable resistor having numerous selectable electric resistance values; and
a comparator including an operational amplifier which has a first input terminal coupled to said sensor for receiving the input voltage and a second input terminal coupled directly to a reference node between said reference resistor and said variable resistor for receiving a reference voltage at said reference node, said comparator directly comparing the input voltage with the reference voltage and, based on the comparison, generating the control voltage at an output of said operational amplifier.

17. A control circuit of claim 16, wherein a resistance value of said reference resistor is independent of the selectable electric resistance values of said variable resistor.

18. A control circuit of claim 16, wherein said regulating circuit further comprises a rotary switch coupled to said variable resistor to enable selection of one among the selectable electric resistance values of said variable resistor, the selected resistance value of said variable resistor defining said internal setting of said regulating circuit.

19. A control circuit of claim 16, wherein said comparator consists of said operational amplifier and a feedback resistor connected between the output of said operational amplifier and the second input terminal which is a non-inverting input terminal.

* * * * *